United States Patent
Craft et al.

(10) Patent No.: US 9,909,715 B2
(45) Date of Patent: Mar. 6, 2018

(54) TRANSMISSION PUMP (71) Applicant: Eaton Corporation, Cleveland, OH (US)

(72) Inventors: Robert B Craft, Ceresco, MI (US); Paul J. Mason, Bellevue, MI (US); Jerry J. Brittan, Mattawan, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/615,890

(22) Filed: Feb. 6, 2015

(65) Prior Publication Data
US 2015/0153001 A1 Jun. 4, 2015

Related U.S. Application Data (63) Continuation of application No. 13/232,959, filed on Sep. 14, 2011, now abandoned.

(60) Provisional application No. 61/382,603, filed on Sep. 14, 2010.

(51) Int. Cl.
| | |
|---|---|
| *F16N 13/20* | (2006.01) |
| *F16N 13/22* | (2006.01) |
| *F16H 57/04* | (2010.01) |
| *F04C 2/10* | (2006.01) |
| *F04C 14/16* | (2006.01) |
| *F04C 14/26* | (2006.01) |
| *F04C 14/28* | (2006.01) |
| *F01M 1/20* | (2006.01) |
| *F01M 1/02* | (2006.01) |

(52) U.S. Cl.
CPC .............. *F16N 13/20* (2013.01); *F04C 2/102* (2013.01); *F04C 2/105* (2013.01); *F04C 14/16* (2013.01); *F04C 14/26* (2013.01); *F04C 14/28* (2013.01); *F16H 57/0404* (2013.01); *F16H 57/0412* (2013.01); *F16H 57/0435* (2013.01); *F16H 57/0436* (2013.01); *F16N 13/22* (2013.01); *F01M 1/20* (2013.01); *F01M 2001/0238* (2013.01)

(58) Field of Classification Search
CPC .. F04C 2/10; F04C 2/102; F04C 14/24; F04C 14/26; F16N 13/20; F16N 13/22; F16H 57/0412; F16H 57/0404
USPC ........................................................ 184/6.12
See application file for complete search history.

(56) References Cited

U.S. PATENT DOCUMENTS

| | | | |
|---|---|---|---|
| 3,878,864 A | | 4/1975 | Schurger |
| 3,977,192 A | * | 8/1976 | Smirnov ............... F04B 43/067 417/383 |
| 4,368,802 A | * | 1/1983 | Grabill .................. F16H 57/043 184/6.12 |
| 4,768,605 A | | 9/1988 | Miller |
| 5,095,936 A | | 3/1992 | Holman |
| (Continued) | | | |

*Primary Examiner* — William E Dondero
*Assistant Examiner* — Mark K Buse
(74) *Attorney, Agent, or Firm* — RMCK Law Group, PLC (57) ABSTRACT

This invention provides both a pump and a lubrication and cooling system with a pump which includes a pump housing, a rotor, a relief valve and a bypass valve. The relief valve is configured to relieve pump pressure when the pump pressure is indicative of an abnormal restriction of flow. The bypass valve is configured to direct fluid flow from an outlet chamber of the pump to an intake chamber of the pump when pressure in the outlet chamber is at a value associated with a predetermined speed of rotor rotation.

14 Claims, 9 Drawing Sheets

(56) References Cited

U.S. PATENT DOCUMENTS

| | | | |
|---|---|---|---|
| 5,544,540 A * | 8/1996 | Holman | F04C 15/0061 |
| | | | 184/6.12 |
| 6,712,028 B1 | 3/2004 | Robbins et al. | |
| 2001/0035220 A1 * | 11/2001 | Russell | E21B 21/106 |
| | | | 137/625.48 |
| 2003/0136371 A1 | 7/2003 | Killion et al. | |
| 2009/0151314 A1 | 6/2009 | Tumelty et al. | |
| 2012/0061184 A1 * | 3/2012 | Craft | F04C 2/102 |
| | | | 184/6.12 |
| 2015/0153001 A1 * | 6/2015 | Craft | F04C 2/102 |
| | | | 184/6.12 |

\* cited by examiner

TRANSMISSION PUMP

CROSS-REFERENCE TO RELATED APPLICATIONS

This application is a continuation application of U.S. application Ser. No. 13/232,959 filed Sep. 14, 2011, which claims the benefit of U.S. Provisional Application No. 61/382,603, filed Sep. 14, 2010, which is hereby incorporated by reference in their entireties.

BACKGROUND OF THE INVENTION

It is desired to provide a lubrication and cooling system for a transmission and a pump for use in such a system which responds to fluid flow restrictions that might occur in a cooler or in a filter. It is also desired to provide such a system for a transmission and a pump which reduces the opportunity for pump cavitation at elevated pump speeds.

SUMMARY OF THE INVENTION

This invention provides both a pump and a lubrication and cooling system with a pump which includes a pump housing, a rotor, a relief valve and a bypass valve. The relief valve is configured to relieve pump pressure when the pump pressure is indicative of an abnormal restriction of flow. The bypass valve is configured to direct fluid flow from an outlet chamber of the pump to an intake chamber of the pump when pressure in the outlet chamber is at a value associated with a predetermined speed of rotor rotation.

This invention also overcomes the pump cavitation at elevated speeds by directing unneeded fluid flow directly from the outlet chamber to an intake chamber by way of the bypass valve. Flow of fluid to the lubrication system is maintained in the event of a restriction in either a cooler or a filter by way of the relief valve.

DETAILED DESCRIPTION OF THE INVENTION

The terms top, bottom, and other directional terms such as front, rear, upper and lower are only used to provide the relative orientation of surfaces and features of the components and system, and are not indicative of the absolute position or orientation of any component or feature.

Figure 1:
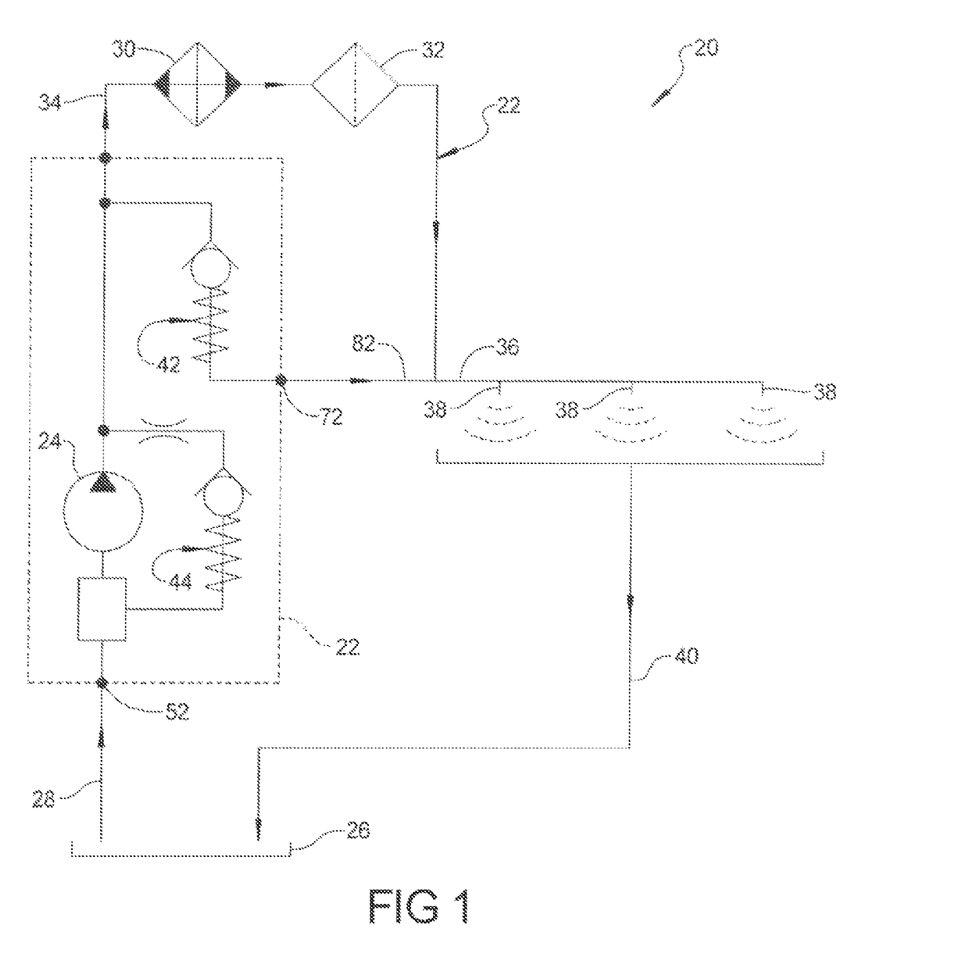
FIG. 1 is a schematic view of a transmission lubrication and cooling system including a pump.
Figure 2:
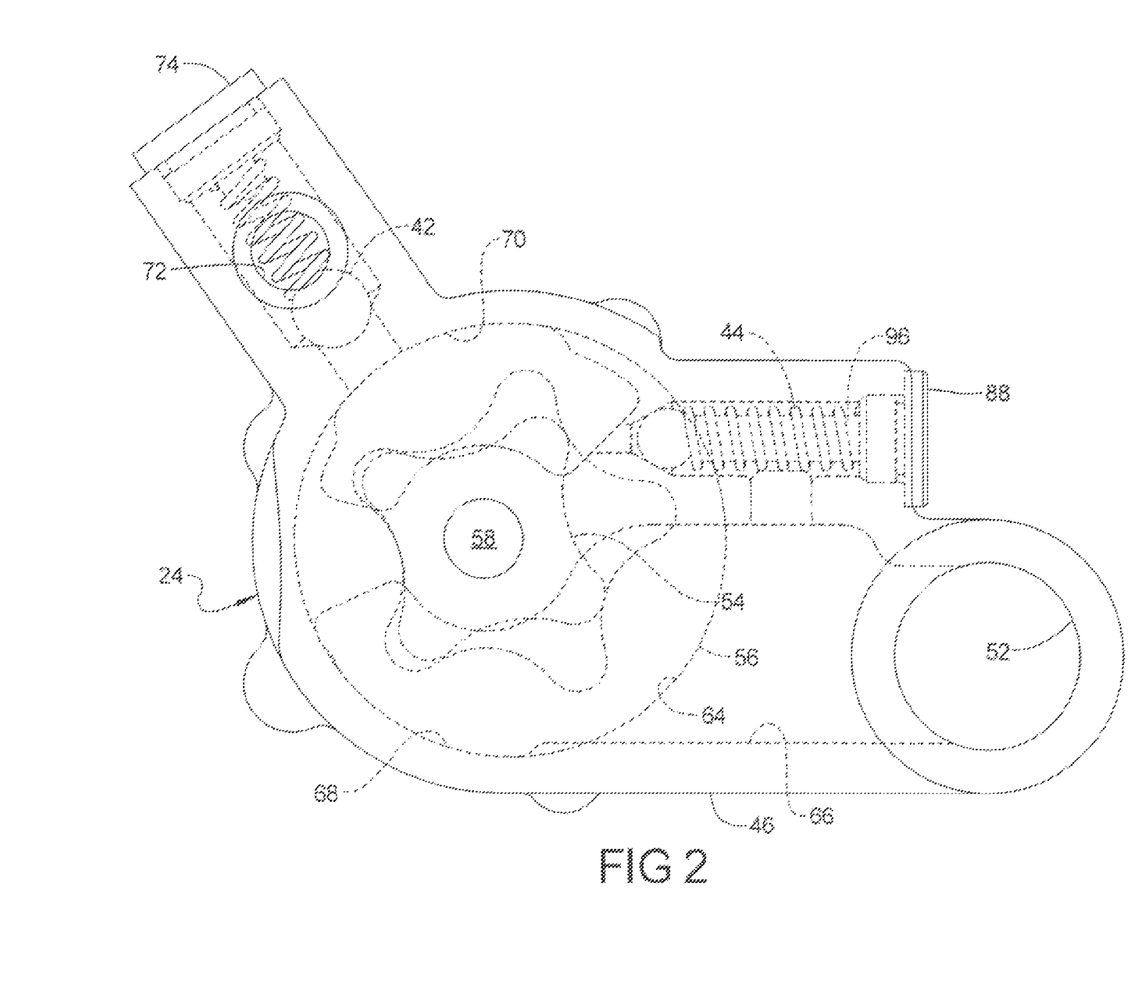
FIG. 2 is a perspective view of the pump of FIG. 1.
Figure 3:
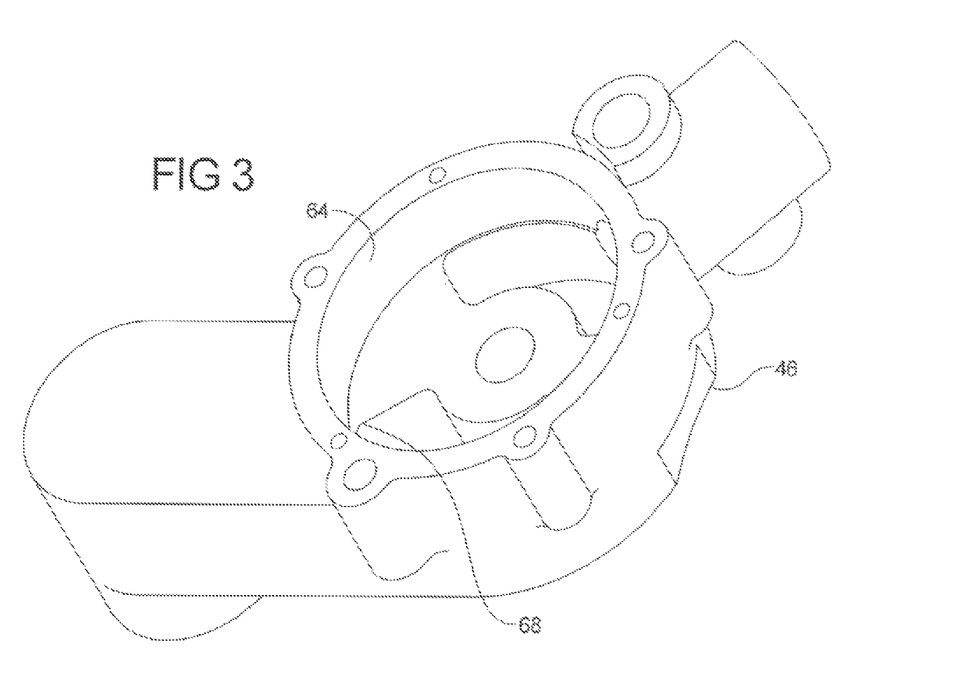
FIG. 3 is a perspective view of a housing of the pump of FIG. 2.
Figure 4:
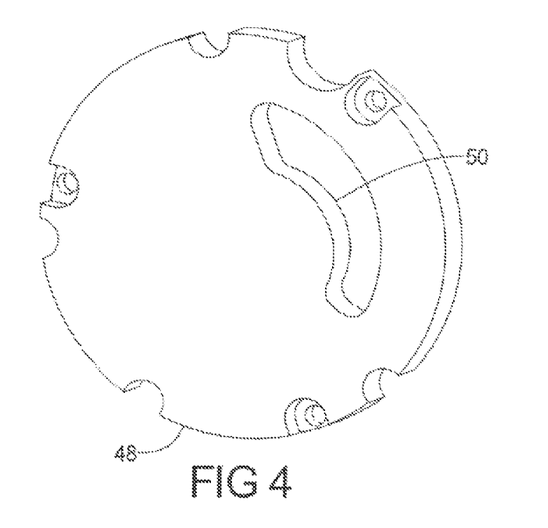
FIG. 4 is a perspective view of a cover plate of the pump of FIG. 2.
Figure 5:
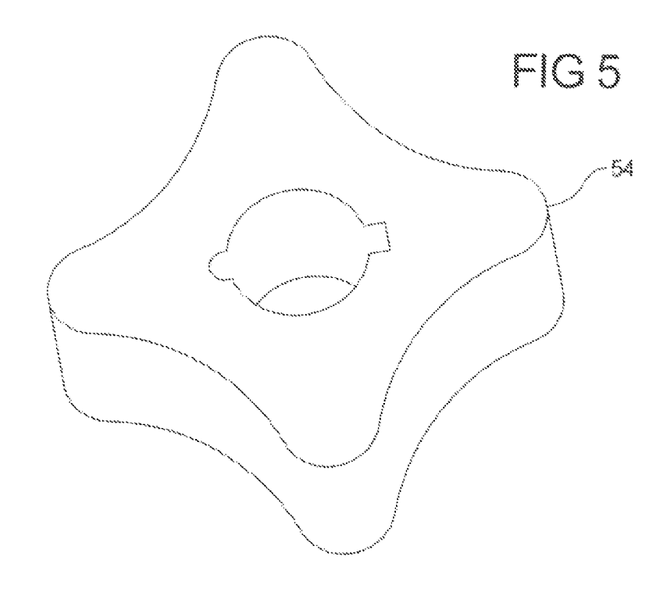
FIG. 5 is a perspective view of a rotor of the pump of FIG. 2.
Figure 6:
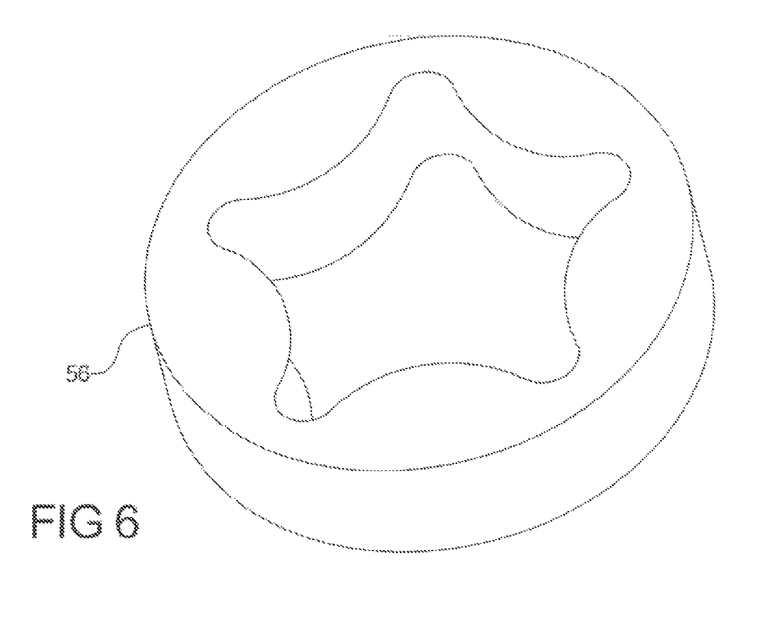
FIG. 6 is a perspective view of a pump idler of FIG. 2.
Figure 7:
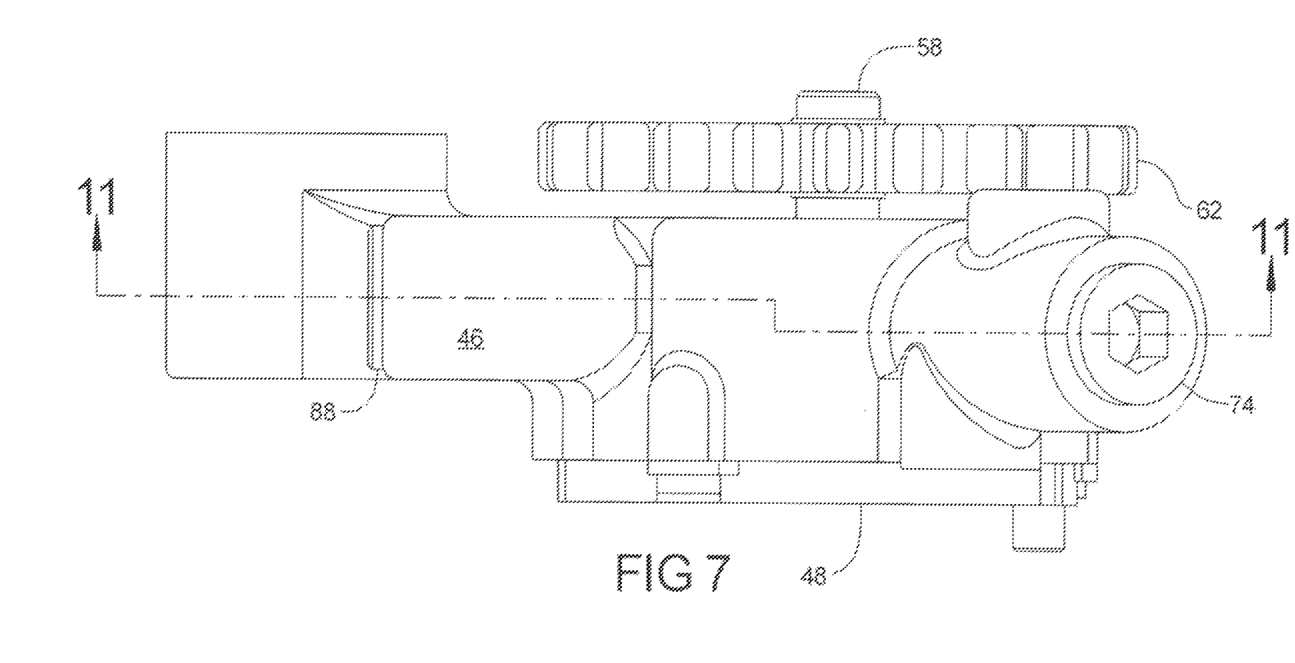
FIG. 7 is a top view of the pump of FIG. 2.
Figure 8:
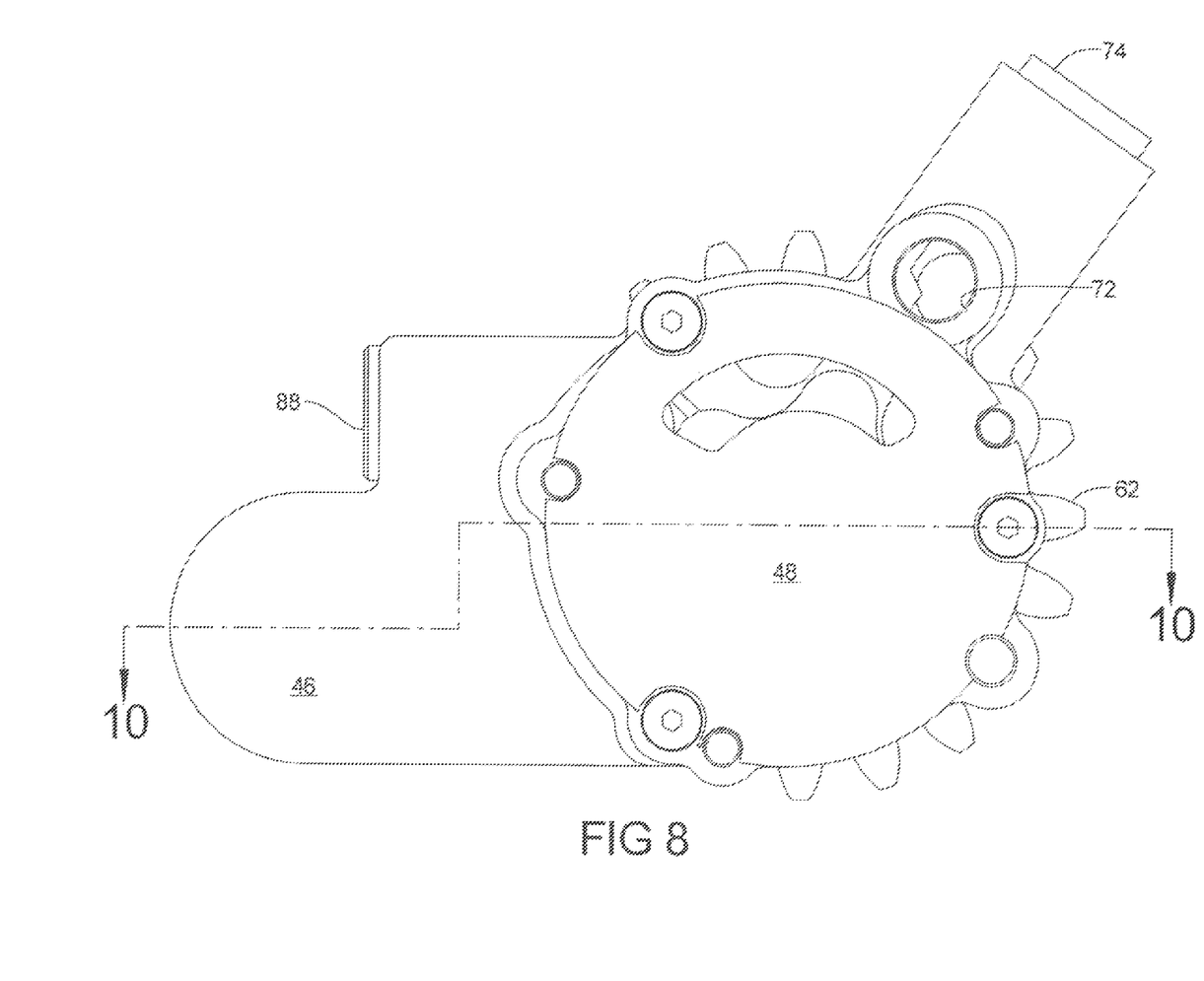
FIG. 8 is a rear view of the pump of FIG. 2.
Figure 9:
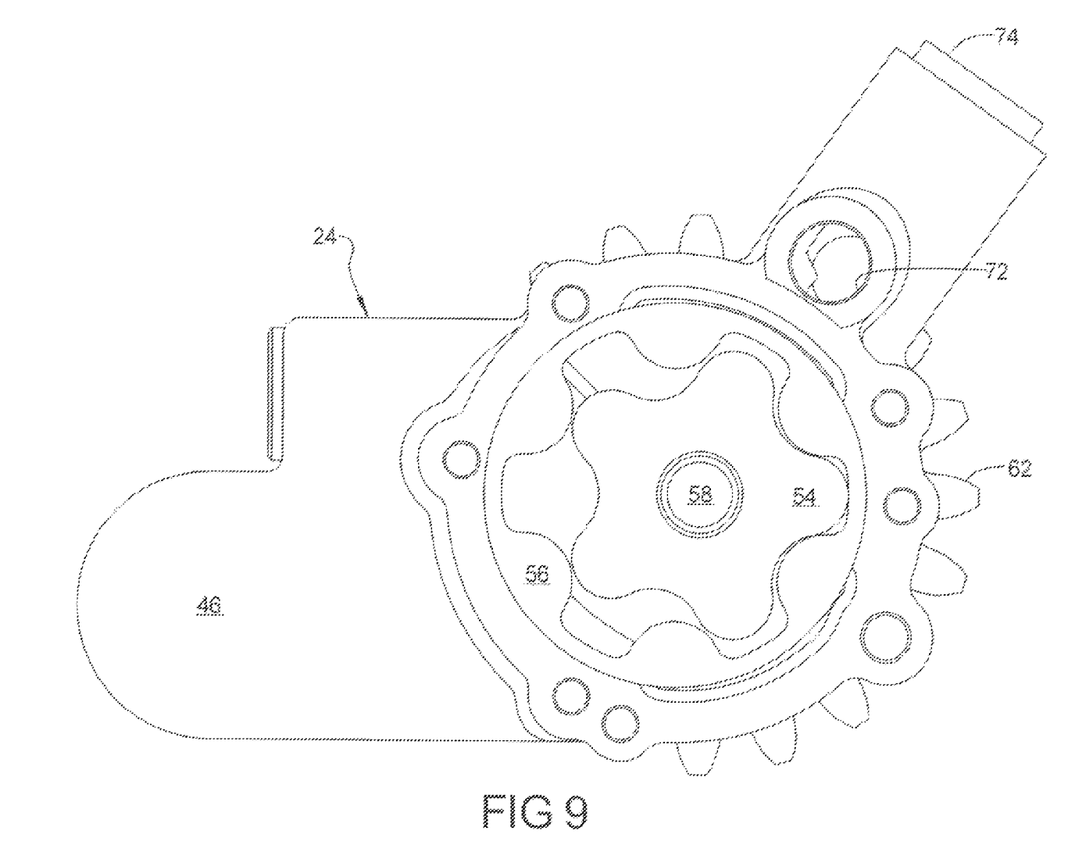
FIG. 9 is a rear view of the pump of FIG. 8 with the cover plate removed.
Figure 10:
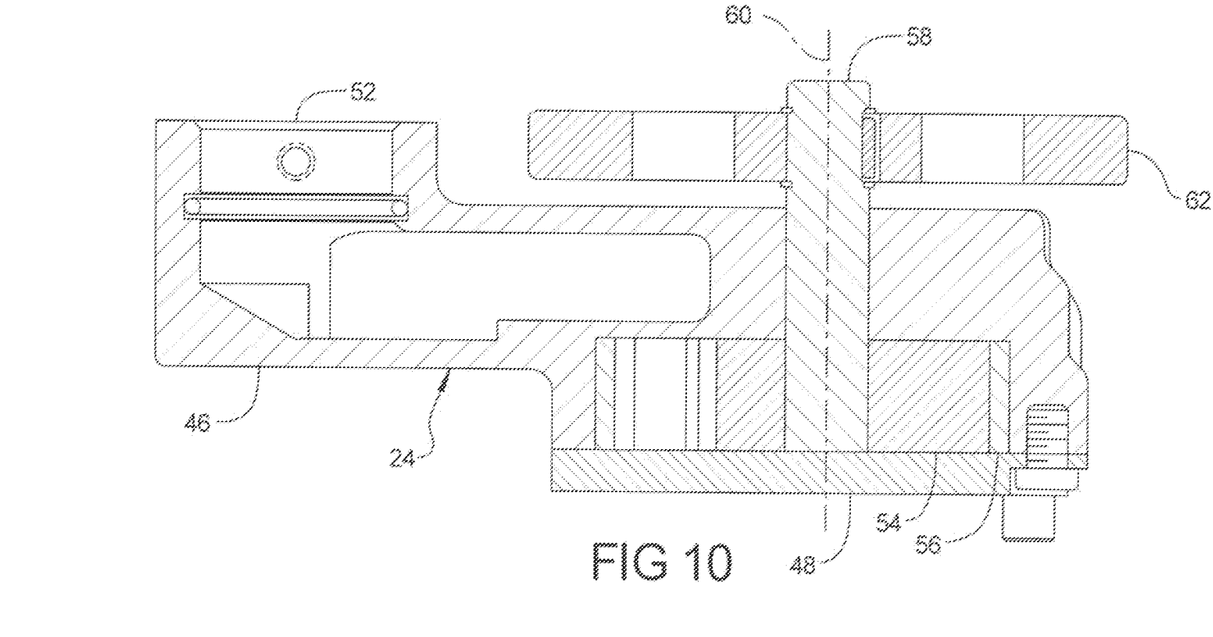
FIG. 10 is a sectional view of the pump of FIG. 8 in the direction of arrows 10.

FIG. 1 shows a transmission lubrication and cooling system 20 including a lubrication and cooling circuit 22, a pump 24 and a sump 26. A suction channel 28 is disposed between and fluidly connects sump 26 and pump 24. A cooler 30 and a filter 32 are fluidly connected to pump 24 by cooling and filter channel 34. A lubrication channel 36 is connected to cooling and filter channel 34. Lubrication channel 36 serves as a conduit of fluid to lubrication system 38. An optional return channel 40 may be used to return fluid to sump 26.

Pump 24 includes a relief valve 42 and a bypass valve 44. Both valves 42 and 44 are incorporated into a housing 46 of pump 24. A cover plate 48 is disposed on a rear or back side of pump housing 46. Cover plate 48 defines outlet port 50.

A suction port 52 of pump 24 is connected to sump 26 by suction channel 28. The illustrated pump is a gerotor style pump, and includes a pump rotor or inner rotor 54 and a pump idler or outer rotor 56, both of which are disposed inside of pump housing 46. As suggested by the figures which variously show rotor 54 having four lobes and idler 56 having five teeth, and rotor 54 having five lobes and idler 56 having six teeth, the invention is not intended to be limited to pumps having a particular count of meshing features. A pump shaft 58 is rotatably fixed to pump rotor 54 by a key (not shown) or equivalent means. Pump shaft 58 rotates about an axis of rotation 60 normal to the pump rotor 54. A drive gear 62 is disposed outside of housing 46 and is rotatably fixed to shaft 58 by a key or equivalent means. Drive gear 62 is an exemplary means by which torque and speed is transferred to shaft 58 and rotor 54. The illustrated drive means is not intended to be limiting.

Housing 46 includes a rotor chamber 64 in which each of rotor 54 and idler 56 are disposed. Other features of housing 46 include an intake chamber 66 which connects directly to suction port 52 and a pump inlet chamber 68 which is fluidly connected with and open to rotor chamber 64. Additionally, an outlet chamber 70 is fluidly connected with both rotor chamber 64 and outlet port 50.

Figure 11:
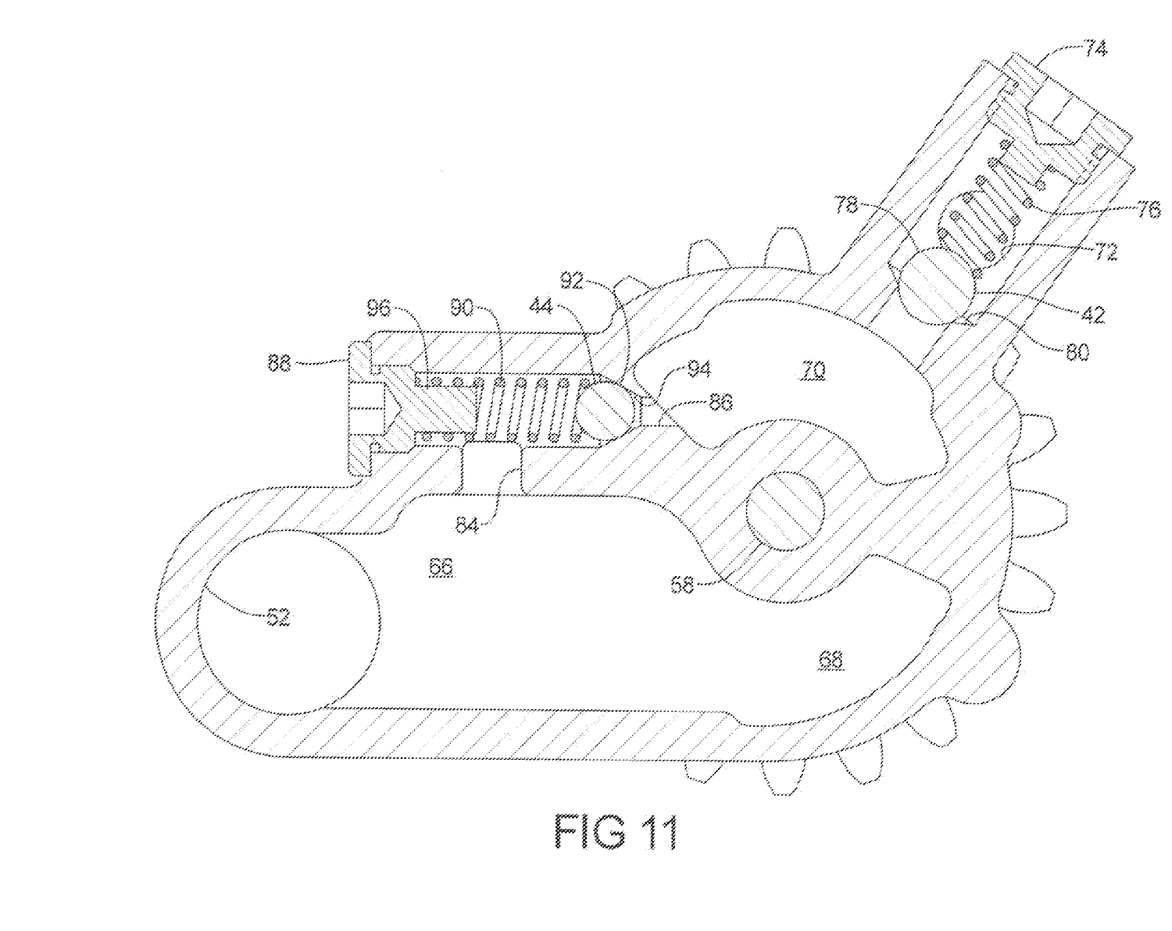
FIG. 11 is a sectional view of the pump of FIG. 7 in the direction of arrows 11.

As best seen in FIG. 11, relief valve 42 is operably disposed between an outlet chamber 70 and a relief port 72. A plurality of ports 72 may be provided. Valve 42 is configured to open to operably fluidly connect outlet chamber 70 with relief port 72. In the embodiment illustrated, a relief valve plug 74 is disposed in housing 46 to retain relief valve bias spring 76. Spring 76 biases relief valve check ball 78 against relief valve ball seat 80. A relief channel 82 fluidly connects relief port 72 with lubrication channel 36.

Bypass valve 44 is operably disposed between outlet chamber 70 and intake chamber 66. Valve 44 is fluidly connected to intake chamber 66 by a bypass channel 84. A bypass passage 86 fluidly connects valve 44 with outlet chamber 70. Valve 44 is configured to open to operably fluidly connect outlet chamber 70 with intake chamber 66. In the embodiment illustrated, a bypass valve plug 88 is disposed in housing 46 to retain bypass valve bias spring 90. Spring 90 biases bypass valve check ball 92 against bypass valve ball seat 94. Passage 86 defines a restrictive orifice through which fluid reaching valve 44 must pass. A travel limit pin 96 may electively be configured to limit the displacement of check ball 92 from seat 94 is disposed in housing 46. Pin 96 may be formed as part of plug 88, or may be a separate component.

A description of the invention operation follows. Pump 24 relies on a conventional gerotor arrangement to draw and pressurize its operating fluid. The operation of such pumps is well known and illustrated in references such as U.S. Pat. No. 4,041,703. In a first condition, at relatively low rotational speeds of shaft 58 and rotor 54, with no abnormal restrictions in cooling and filtering channel 34, each of relief valve 42 and bypass valve 44 are in a closed condition, with all of the fluid displaced by the rotation of rotor 54 being drawn from sump 26 through suction channel 28 and passing through outlet port 50, through cooler 30 and filter 32 and lubrication system 38. Examples of conditions constituting an abnormal restriction include a plugged or partially plugged cooler 30, and a plugged or partially plugged filter 32. An abnormal restriction might also result from high fluid viscosity at start-up due to a low ambient temperature.

In a second condition, at a first pressure within outlet chamber 70 corresponding to a predetermined speed of rotor 54, bypass valve 44 opens to allow operating fluid to flow from outlet chamber 70 to intake chamber 66 where it joins fluid being drawn up from sump 26 through channel 28. The quantity of fluid reaching intake chamber beneficially helps avoid cavitation of the pump. While alternative solutions might include increasing the sizing of the suction channel and optimizing the location of the pump relative to the sump, the present invention enables greater flexibility in the location of the pump. The restriction provided by the orifice sizing of passage 86 reduces the rate of flow to the intake chamber. The combination of spring selection and orifice sizing enable one skilled in the art to provide a pressure and flow combination suited for the application at hand. Intake chamber 66 has a greater cross sectional area in the flow direction than suction channel 28, accommodating the additional volumetric flow past bypass valve 44 and facilitating an increased volumetric flow into adjoining inlet chamber 66 which feeds operating fluid to rotating rotor 54. All of the pressurized operating fluid in outlet provided by the rotation of rotor 54, excepting that which travels past valve 44, exits through outlet port 50 and passes through cooler 30, filter 32 and lubrication system 38. An exemplary range of pressure at which valve 44 opens is 67 pounds per square inch (psi) to 71 psi.

In a third condition, as the operating fluid within outlet chamber 70 reaches a second pressure indicative of an abnormal restriction of flow in cooling and filtering channel 34, relief valve 42 opens to allow operating fluid to flow from outlet chamber 70 to lubrication system 38 via relief channel 82. Routing the flow from the relief valve to the lubrication system instead of directly to the sump enables system 20 to maintain the flow of operating fluid critical lubrication of the transmission, thereby avoiding damage to the transmission. As in the second condition, operating fluid flows past bypass valve 44. The amount of fluid, if any, passing through cooler 30 and filter 32 will depend on the extent of blockage. An exemplary range of pressure at which valve 42 opens is 114 psi to 142 psi. The appropriate range of pressures for any particular application of the inventive system will vary with that application. Factors influencing pressure ranges for both the bypass and relief valves include, but are not limited to, the viscosity of the operating fluid, the anticipated operating temperatures, and the anticipated back pressure of the system under normal operating conditions.

The scope of the invention is set forth in the claims below.

We claim:

1. A lubrication and cooling system for a transmission comprising:
   a pump including:
      a pump housing defining:
         a suction port,
         an outlet port,
         a rotor chamber disposed between the suction port and the outlet port,
         an intake chamber fluidly connected to the suction port,
         an inlet chamber fluidly connected to the intake chamber and fluidly connected to the rotor chamber,
         an outlet chamber fluidly connected to the rotor chamber and fluidly connected to the outlet port;
      a rotor rotatably disposed in the rotor chamber having a first portion in fluid communication with the outlet chamber and having a second portion in fluid communication with the inlet chamber;
   a relief valve operably disposed between the outlet chamber and a relief port though the housing and configured to operably fluidly connect the outlet chamber with the relief port when a pressure in the outlet chamber is at or above a first value indicative of an abnormal restriction of flow from the outlet chamber;
   a bypass valve operably disposed between the outlet chamber and the intake chamber and configured to operably fluidly connect the outlet chamber with the intake chamber when the pressure in the outlet chamber is at or above a second value less than the first value and indicative of a pressure in the outlet chamber at or above a pressure associated with a predetermined speed of rotation of the rotor, the bypass valve and the relief valve geometrically configured relative to the outlet chamber such that the bypass valve opens prior to the opening of the relief valve;
   a restrictive orifice disposed between the outlet chamber and the bypass valve; and
   a lubrication and cooling fluid circuit including:
      a cooling and filtering channel on which a cooler and a filter are operably disposed and fluidly connecting the outlet port of the pump with a lubrication channel; the lubrication channel configured to distribute fluid to predetermined points within the transmission; and
      a relief channel fluidly connecting the relief port to the lubrication channel.

2. The lubrication and cooling system as claimed in claim 1 wherein the relief valve includes a relief check ball and a spring biasing the relief check ball to a closed position and the bypass valve includes a bypass check ball and a spring biasing the bypass check ball to a closed position.

3. The lubrication and cooling system as claimed in claim 2 wherein the bypass valve includes a travel limit pin configured to limit the displacement of bypass check ball away from a seated position.

4. The lubrication and cooling system as claimed in claim 1 wherein the intake chamber has a greater cross sectional area in a flow direction than a suction channel that supplies operating fluid into the lubrication and cooling fluid circuit.

5. The lubrication and cooling system of claim 1 wherein pressurized fluid one of (i) exits the outlet port of the pump and passes through the cooler, a filter and lubrication channel and (ii) travels past the bypass valve.

6. A lubrication and cooling system for a transmission comprising:
   a pump including:
      a pump housing defining:
         a suction port,
         an outlet port,
         a rotor chamber disposed between the suction port and the outlet port,
         an intake chamber fluidly connected to the suction port, an inlet chamber fluidly connected to the intake chamber and fluidly connected to the rotor chamber, an outlet chamber fluidly connected to the rotor chamber and fluidly connected to the outlet port;

a rotor rotatably disposed in the rotor chamber having a first portion in fluid communication with the outlet chamber and having a second portion in fluid communication with the inlet chamber;

a relief valve operably disposed between the outlet chamber and a relief port though the housing and configured to operably fluidly connect the outlet chamber with the relief port when a pressure in the outlet chamber is at or above a first value indicative of an abnormal restriction of flow from the outlet chamber;

a bypass valve operably disposed between the outlet chamber and the intake chamber and configured to operably fluidly connect the outlet chamber with the intake chamber when the pressure in the outlet chamber is at or above a second value less than the first value and indicative of a pressure in the outlet chamber at or above a pressure associated with a predetermined speed of rotation of the rotor, the bypass valve and the relief valve configured for staged pressure relief such that the bypass valve opens prior to the opening of the relief valve;

a restrictive orifice disposed between the outlet chamber and the bypass valve; and a lubrication and cooling fluid circuit including:
    a cooling and filtering channel on which a cooler and a filter are operably disposed and fluidly connecting the outlet port of the pump with a lubrication channel; the lubrication channel configured to distribute fluid to predetermined points within the transmission; and
    a relief channel fluidly connecting the relief port to the lubrication channel.

7. The lubrication and cooling system as claimed in claim 6 wherein the relief valve includes a relief check ball and a spring biasing the relief check ball to a closed position and the bypass valve includes a bypass check ball and a spring biasing the bypass check ball to a closed position.

8. The lubrication and cooling system as claimed in claim 7 wherein the bypass valve includes a travel limit pin configured to limit the displacement of bypass check ball away from a seated position.

9. The lubrication and cooling system as claimed in claim 6 wherein the intake chamber has a greater cross sectional area in a flow direction than a suction channel that supplies operating fluid into the lubrication and cooling fluid circuit.

10. The lubrication and cooling system of claim 6 wherein pressurized fluid one of (i) exits the outlet port of the pump and passes through the cooler, a filter and lubrication channel and (ii) travels past the bypass valve.

11. A lubrication and cooling system for a transmission comprising:
    a pump including:
        a pump housing defining:
            a suction port,
            an outlet port,
            a rotor chamber disposed between the suction port and the outlet port,
            an intake chamber fluidly connected to the suction port,
            an inlet chamber fluidly connected to the intake chamber and fluidly connected to the rotor chamber,
            an outlet chamber fluidly connected to the rotor chamber and fluidly connected to the outlet port;

a rotor rotatably disposed in the rotor chamber having a first portion in fluid communication with the outlet chamber and having a second portion in fluid communication with the inlet chamber;

a relief valve operably disposed between the outlet chamber and a relief port though the housing and configured to operably fluidly connect the outlet chamber with the relief port when a pressure in the outlet chamber is at or above a first value indicative of an abnormal restriction of flow from the outlet chamber, wherein the relief valve includes a relief check ball and a spring biasing the relief check ball to a closed position;

a bypass valve operably disposed between the outlet chamber and the intake chamber and configured to operably fluidly connect the outlet chamber with the intake chamber when the pressure in the outlet chamber is at or above a second value less than the first value and indicative of a pressure in the outlet chamber at or above a pressure associated with a predetermined speed of rotation of the rotor, wherein the bypass valve includes a bypass check ball and a spring biasing the bypass check ball to a closed position, the bypass valve further including a travel limit pin configured to limit the displacement of the bypass check ball away from a seated position;

a restrictive orifice disposed between the outlet chamber and the bypass valve; and a lubrication and cooling fluid circuit including:
    a cooling and filtering channel on which a cooler and a filter are operably disposed and fluidly connecting the outlet port of the pump with a lubrication channel; the lubrication channel configured to distribute fluid to predetermined points within the transmission; and
    a relief channel fluidly connecting the relief port to the lubrication channel.

12. The lubrication and cooling system as claimed in claim 11 wherein the intake chamber has a greater cross sectional area in a flow direction than a suction channel that supplies operating fluid into the lubrication and cooling fluid circuit.

13. The lubrication and cooling system of claim 11 wherein pressurized fluid one of (i) exits the outlet port of the pump and passes through the cooler, a filter and lubrication channel and (ii) travels past the bypass valve.

14. The lubrication and cooling system of claim 11 wherein the bypass valve is configured to open to avoid cavitation of the pump.

* * * * *